H. R. EVANS, DEC'D.
A. K. EVANS, EXECUTRIX.
PROJECTION LAMP.
APPLICATION FILED OCT. 22, 1918.
1,436,308.
Patented Nov. 21, 1922.
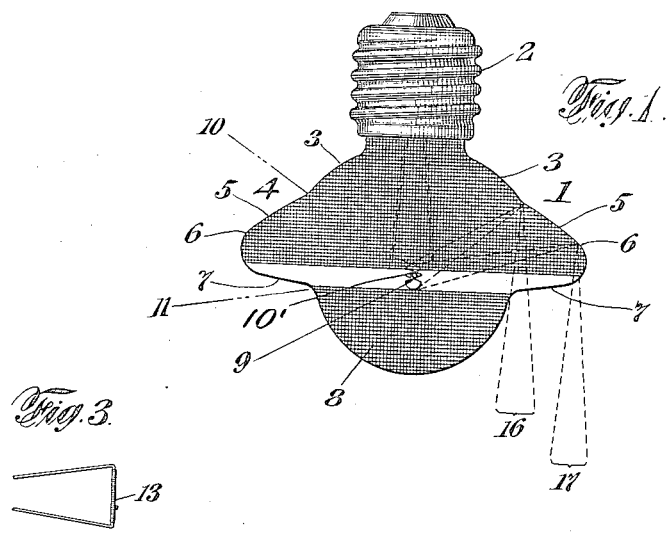
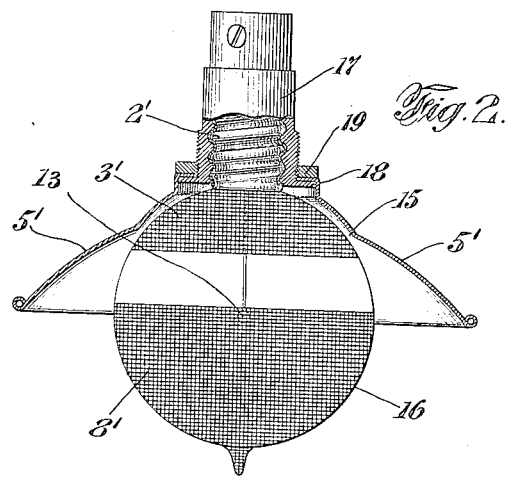
Henry R. Evans, Inventor
By his Attorney Patented Nov. 21, 1922.

1,436,308

UNITED STATES PATENT OFFICE.

HENRY R. EVANS, OF NEW YORK, N. Y.; ADELE KEAN EVANS EXECUTRIX OF SAID HENRY R. EVANS, DECEASED.

PROJECTION LAMP.

Application filed October 22, 1918. Serial No. 259,250.

*To all whom it may concern:*

Be it known that I, HENRY R. EVANS, a citizen of the United States, and a resident of the borough of Manhattan, city, county, and State of New York, have invented certain new and useful Improvements in Projection Lamps, of which the following is a specification.

My invention relates to projection lamps, and the invention is especially adapted for projecting a well-defined beam of light for relatively great distances, say three to ten miles. Projection lamps of compact form, simple construction and low current consumption capable of projecting such beams of light that, while concentrated, shall not be so concentrated as to require extremely accurate and steady sighting, are of great value for signaling at sea, particularly from and to warships, submarines, etc., and in signaling from airplanes; and they are also of great utility when utilized as landing lights for airplanes. The invention is also well adapted as a headlight for road vehicles, and for other purposes, but due to the exacting requirements as to size and high efficiency demanded of aeroplane and other signaling lamps, the invention is especially useful as a signaling lamp.

In one aspect, the present invention is intended as an improvement on the invention covered by United States Letters Patent No. 1,239,371, granted to me on September 4, 1917, for combined reflector and source of light in the same. In said patent there was disclosed and described in detail the advantages and increased efficiency in a projection lamp having a concave optically substantially spherical reflecting surface surrounding a concentrated source of light located substantially centrally of the spherical reflector, and with the area of said reflecting surface being substantially greater than half the reflecting or concave area of half of the sphere; the advantage of this construction being due to the re-reflection of the rays emanating from the source, thus setting up what was termed in said patent as "gyration" of reflection of the rays, so that substantially all of the rays that passed through the light opening were of the same general order or class as regards divergency of rays, so that the rays could be dealt with efficiently by suitable optical systems such as reflectors or lenses, to project them into a desired beam. In the particular form of the invention therein shown and described the light opening was shown in the form of either a square or spherical opening at the front of the lamp, so that when the lamp was to be used for projection purposes it was used in connection with suitable lens systems as therein shown, and if used with a reflector such as a parabolic reflector, for example, the light opening would have to be turned rearwardly to face the rearmost point of the necessarily relatively long focal length reflecting surface.

The present invention in its preferred form, is in the nature of an improvement on said former invention, in that it relates to a special adaptation of said lamp and of parabolic reflectors one to the other; so as to provide a combination which results in a more efficient, compact and cheaper signaling lamp of special value for the uses mentioned. But the present invention is not to be regarded as limited in all of its aspects by the embodiment of my said former invention.

The present invention consists in the novel features, combinations and arrangement of parts hereinafter described in their preferred form, and the invention is more particularly pointed out in the appended claims.

Further objects and advantages of the invention will more fully appear from the following description taken in connection with the accompanying drawings illustrating the preferred forms of the invention, and in which—

Fig. 1 is a side elevation of one embodiment of the invention;

Fig. 2 is a side elevation partly in section, of another embodiment of the invention; and Fig. 3 is a plan view of an electric filament that may be used with either form of the invention.

In the drawings, Fig. 1 shows the invention embodied in the form of a specially shaped electric lamp shell, usually termed a "bulb," and molded of glass and having reflecting surfaces formed thereon by suitable metallic coatings. In this drawing, the shell 1 is secured in any suitable manner to the base 2 that may be of any well-known or desired construction to couple the lamp up to the desired socket or contact wires. The shell may be regarded as being composed of three portions, a rear portion 3, spherical in contour, an intermediate portion 4 beginning at the forward end of the spherical portion 3 and continuing therefrom in the form of a section of a parabola or parabolic curve 5 substantially to the point of maximum diameter at 6 where the curve rounds off and is connected with the forward portion of the shell by a forwardly and inwardly inclined flange 7; the forward portion 8 of the shell being of spherical form struck about the same center 9 as the rear spherical portion 3. Both the forward and rear spherical portions 3 and 8 and the parabolic portion 5 are silvered preferably by exteriorly applied coatings, to form reflecting surfaces, while the connecting flange 7 is left unsilvered for the forward projection of the light rays. The principal focus of the parabolic section 5 coincides with the center 9 of the spherical reflecting surfaces. It will be observed that the sum of the spherical angles about the center 9, subtended respectively by the forward spherical reflecting portion 8 and the rear spherical reflecting portion 3, is substantially greater than the sum of the remaining spherical angles about said center, and that, except for the annular light opening between the bases of the forward and rear spherical reflecting portions designated by 10 and 11, the filament or light source 10' which is in the form of a concentrated source, may be regarded as being surrounded by an optically substantially spherical reflecting surface, which is, except for said opening, optically a substantially closed sphere.

It will be observed in connection with Fig. 1, that the forward end of the parabolic curve 5 terminates in a downwardly inclined curve forming a rounded corner, from whence the flange 7 tapers forwardly and inwardly to the base of the spherical portion where the juncture of the two latter is rounded. These features are of importance as regards structural strength and durability of the lamp in view of the vacuum and other strains during manufacture and use. These corners if desired can be covered with a light absorbing paint or cover to prevent light incident upon them from passing out in undesirable directions. Light from the source falling upon the tapering flange 7 will not be transmitted therethrough due to its high angle of incidence.

The forward spherical portion 8 may in one aspect be regarded as an opaque cap preventing the forward projection of any light rays directly from the source, which rays if they came directly from the source would be substantially of the radially diverging type; and the rear spherical portion 3 may be regarded as replacing the deep or rear portion of what would be the continuation of the parabolic reflector should the parabolic curve 5 have been continued rearwardly. The substitution of this spherical reflector 3 for the deep or rear portion of the parabolic curve or reflector, is very advantageous in connection with the forward spherical reflecting surface 8 where projection of light beams for great distances is necessary, because of the fact that the deeper or rear portion of a parabolic reflector does not project light rays with as high a degree of parallelism due to the increased angle subtended by the light source thereon, as do the forward portions. This is particularly true of short focal length parabolas such as must be employed if the maximum compactness is to be obtained; so that if an optical system of reflectors or reflecting surfaces were used, including the deeper or rear portion of such a parabolic reflector upon which light rays impinged, such rays as were allowed to impinge upon the deep portion of the parabolic reflector could only be very inefficiently dealt with by any optical means in an effort to make them usefully conform to the desired projected light beam. Aside from the functions mentioned of the spherical reflecting surfaces 8 and 3, they co-operate to produce re-reflection or gyration of reflections of the rays emanating from the light source 10', as described in my said prior patent, with the resulting advatnages set forth in said patent, among which are the features that the rays of light emanating from such a spherical reflector pass through the light opening in such manner that they may be all efficiently dealt with for projection purposes by the same optical means, and that the intensity of the light so emanating is greatly increased as more and more of the total optical sphere is silvered.

The parabolic reflecting portion 5 optically surrounds the annular light opening between the spherical reflecting portions 3 and 8, and is arranged so that it intercepts substantially all of the light rays that emanate directly from the source through the light opening between the spherical reflecting surfaces as well as substantially all the rays that are reflected or re-reflected from said spherical reflecting surfaces through said light opening, except such as are incident upon the necessary rounded corners and tapering flange 7; so that the rays of the forwardly projected beam all come from the parabolic reflector.

It will be observed from this arrangement and co-operation of the reflecting surfaces that no substantial amount of light rays which may be regarded as divergent in character with respect to the desired beam, are allowed to be projected forward. A few may, according to the exact extent of the forward continuation of the parabolic reflecting surface, or the rear continuation of the forward spherical reflecting surface, be allowed to pass through the shell in a more or less radial manner when so desired, and a certain amount of light which is incident upon the rounded corners and tapering flange will be lost; but all rays that would otherwise be forwardly projected divergent rays are caught by the cap 8 and reflected or re-reflected onto one of the two other reflecting surfaces in such manner that an unusually large amount of the total light rays are forwardly projected, and substantially all forwardly projected rays are projected in the form of what is known as a well defined beam, all being divergent to an unusually similar degree, as will be seen by tracing the inner and outer extreme ray bundles 16 and 17 of Fig. 1, so that they will intensify and conform to the projected beam of light for a greater distance than would otherwise be possible from an apparatus of the same size and current consumption. The result is a very far-penetrating beam of light.

When the shell or bulb of the lamp is molded so that the various reflecting surfaces may be formed by suitable metallic coatings thereon, it not only increases the efficiency of the reflecting surfaces, but it preserves their brilliancy by protecting them from dirt and atmospheric conditions, and it also provides a smoother or more nearly streamline contour for the lamp as a whole to cut down wind resistance, while the heat developed within this lamp automatically rids the entire outfit of any frozen rain or moisture which may accumulate thereon, thus quickly restoring the normal optical properties of the unit in any weather, which is of great advantage in connection with the use of such lamps on airplanes as signaling or landing lights.

In Fig. 2 I have shown another modification in which the parabolic reflector 5' is formed at the forward portion of a metallic housing 15 partly enclosing a spherical bulb 16 having forward and rear metallic coatings forming forward and rear spherical reflecting portions 8' and 3'. The metallic housing at the rear of the parabolic reflector portion is preferably of a slightly different contour from the base of the bulb so as to allow some room for ventilation between the bulb and the casing. The base of the bulb 2' fits into any suitable socket 17 having a forward flange 18 against which the base of the housing is clamped by a suitable nut 19 threaded onto the outside of the socket.

The source of light in this form of the invention is preferably in the form of a coil of wire 13, as shown in Fig. 3, arranged horizontally with its axis approximately at the center of the bulb. If the filament is made of this form it is of special utility as a headlight for road vehicles, since it tends to produce a horizontally elongated beam of light which will spread out laterally over the roadway. In this form of the invention it will be observed that the silvering on the surface of this forward spherical segment of the bulb is carried further to the rear than in the first modification, so as to include the zone occupied by the rounded corners and inclined flange 7 of Fig. 1, thus utilizing with greater efficiency the light rays falling within this area.

The importance of the feature possessed by lamps constructed in accordance with this invention, of not only utilizing, but preventing what would otherwise be divergent forwardly projected light rays, will be appreciated when it is borne in mind that such stray light is likely at night to illuminate surrounding objects and thus disclose the presence of the signalman, and in any case to render the message readable from a point out of line with the intended receiving station.

Having thus described my invention, what I claim as new and desire to secure by Letters Patent, is:—

1. In a reflector lamp, the combination of a substantially spherical incandescent electric lamp bulb having a concentrated source of light located centrally thereof and also having a reflecting coating on opposed forward and rear segments thereof, forming opposed concave segmental reflecting surfaces with an intervening light-transmitting area through which the light rays are reflected from said segmental reflecting surfaces.

2. In a reflector lamp, the combination of a substantially spherical incandescent electric lamp bulb having a concentrated source of light located centrally thereof and also having a reflecting coating on opposed forward and rear segments thereof, forming forward and rear concave segmental reflecting surfaces constituting together a substantially optically closed sphere except for an intermediate annular light-transmitting area, the spherical angle subtended by said area being substantially less than half the entire spherical angle, and through which area the light rays are reflected from said segmental reflecting surfaces, and optical means surrounding said light-emitting area adapted to intercept and forwardly project the light rays passing through said area.

3. In a reflector lamp, the combination of a substantially spherical incandescent electric lamp bulb having a concentrated source of light located centrally thereof and also having a reflecting coating on opposed forward and rear segments thereof, forming forward and rear concave segmental reflecting surfaces constituting together a substantially optically closed sphere except for an intermediate annular light-transmitting area, the spherical angle subtended by said area being substantially less than half the entire spherical angle, and through which area the light rays are reflected from said segmental reflecting surfaces.

4. In a reflector lamp, the combination of a substantially spherical incandescent electric lamp bulb having a reflecting coating on opposed forward and rear segments thereof, forming opposed concave segmental reflecting surfaces the combined areas of which constitute the major portion of the total area of the bulb, and with an intervening annular light-emitting area through which the light rays are reflected from said segmental reflecting surfaces, and a light-transmitting conductor within said bulb arranged to constitute a concentrated source and located centrally of said bulb, and while being concentrated, having a sufficient area off the center point to insure the necessary rate of "gyration of reflections" to very materially intensify, by re-reflected rays, the zone of light emitted from said bulb, and optical means surrounding said annular light-transmitting area adapted to intercept and forwardly project the light rays in a more concentrated beam.

5. In a reflector lamp, the combination of a substantially spherical incandescent electric lamp bulb having a reflecting coating on opposed forward and rear segments thereof, forming opposed concave segmental reflecting surfaces the combined areas of which constitute the major portion of the total area of the bulb, and with an intervening annular light-transmitting area through which the light rays are reflected from said segmental reflecting surfaces, and a light-emitting conductor within said bulb arranged to constitute a concentrated source and located centrally of said bulb, and while being concentrated, having a sufficient area off the center point to insure the necessary rate of "gyration of reflections" to very materially intensify, by re-reflected rays, the zone of light emitted from said bulb.

6. In a reflector lamp; the combination of a front optically substantially spherical concave segmental reflector portion adapted to intercept and reflect back substantially all rays subtended by the segment, and an opposed rear concave optically substantially spherical reflector portion, said spherical reflectors having between them a light-transmitting area, an annular section of a parabolic reflector interposed optically between said spherical reflector portions and surrounding said light-transmitting area so as to intercept light rays reflected through said area from the forward spherical reflector and such as may emanate through said area directly from the source, the centers of said spherical reflectors and the principal focus of said parabolic reflector being substantially coincident, and a concentrated source of light located substantially at said center, whereby the rays of the forwardly projected beam are substantially all projected forwardly from said parabolic reflector and pass out between said parabolic and forward spherical reflecting portions.

7. A reflector lamp comprising a spherical reflector consisting of forward and rear reflecting surfaces constituting a substantially optically closed sphere except for an intermediate annular light opening the spherical angle subtended by which is substantially less than half the entire spherical angle, and an annular section of a parabolic reflector surrounding said light opening and adapted to intercept and forwardly project light rays passing through said light opening, and a concentrated source of light located centrally of said spherical reflector.

In testimony whereof, I have signed my name to this specification.

HENRY R. EVANS.